United States Patent
Burukhin et al.

(10) Patent No.: US 7,931,966 B2
(45) Date of Patent: Apr. 26, 2011

(54) PROPPANT MATERIAL AND FORMATION HYDRAULIC FRACTURING METHOD

(75) Inventors: Alexander Burukhin, Novosibirsk (RU); Anatoly Matveev, Novosibirsk (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/768,393

(22) Filed: Jun. 26, 2007

(65) Prior Publication Data

US 2008/0000638 A1    Jan. 3, 2008

(30) Foreign Application Priority Data

Jun. 29, 2006    (RU) ................................ 2006123073

(51) Int. Cl.
*C09K 8/80* (2006.01)
*E21B 43/267* (2006.01)
*B32B 23/00* (2006.01)

(52) U.S. Cl. ...................... 428/402; 166/280.2; 507/924

(58) Field of Classification Search ......................... None
See application file for complete search history.

(56) References Cited

U.S. PATENT DOCUMENTS

| | | | |
|---|---|---|---|
| 4,078,610 A * | 3/1978 | Arnold | 166/280.1 |
| 5,330,005 A | 7/1994 | Card | |
| 5,908,073 A | 6/1999 | Nguyen | |
| 6,059,034 A | 5/2000 | Rickards | |
| 6,330,916 B1 | 12/2001 | Rickards | |
| 6,725,930 B2 | 4/2004 | Boney | |
| 2003/0196805 A1 * | 10/2003 | Boney et al. | 166/280 |
| 2005/0028976 A1 * | 2/2005 | Nguyen | 166/276 |
| 2008/0135242 A1 * | 6/2008 | Lesko et al. | 166/268 |
| 2008/0135245 A1 * | 6/2008 | Smith et al. | 166/280.2 |

* cited by examiner

*Primary Examiner* — Zakiya W. Bates
(74) *Attorney, Agent, or Firm* — David Cate; Robin Nava; Jeff Griffin

(57) ABSTRACT

A proppant material is provided that is in the form of generally rigid, elastic plate-like particles having a maximum to minimum dimension ratio of more than about 5. The proppant may be formed from a corrosion resistant material or having a corrosion resistant material formed thereon. The plate-like particles may be substantially non-deformable and may be formed from stainless steel or carbon steel provided with a corrosion resistant coating. The particles may have a thickness of from about 100 to about 300 μm and may be in the form of a grating. A method of hydraulic fracturing in a formation penetrated by a wellbore is also provided wherein proppant material in the form of generally rigid, elastic plate-like particles having a maximum to minimum dimension ratio of more than about 5 are introduced into the wellbore. The particles may be formed from a corrosion resistant material or having a corrosion resistant material formed thereon. Non-plate-like proppant may be introduced into the wellbore in conjunction with the plate-like proppant.

6 Claims, 3 Drawing Sheets

PROPPANT MATERIAL AND FORMATION HYDRAULIC FRACTURING METHOD

This application claims foreign priority benefits under 35 U.S.C. §119(a)-(d) to Russian Patent Application No. 2006123073, filed Jun. 29, 2006.

BACKGROUND

This invention relates to the oil and gas industry, more specifically, to increasing the permeability of propped fractures that are formed during hydraulic fracturing of subterranean formations.

U.S. Pat. No. 6,725,930 describes an underground formation hydraulic fracturing method wherein at least part of the fracture is filled with a proppant material in the form of elongated particles, which may be in the form of segments of metallic wire, with a maximum to minimum dimension ratio of more than 5. The rest of the fracture is filled with standard non-metallic proppant. The fracture permeability increases as a result.

In U.S. Pat. No. 6,059,034, an underground formation is treated by filling a fracture with a proppant material and deformed particles. The deformed particles can be combined with the proppant for increasing fracture permeability, reducing the production of fine grained particles and/or reduction of proppant backflow. The material used for hydraulic fracturing can be sand, and the deformed particles can be polystyrene divinylbenzene beads.

U.S. Pat. No. 5,908,073 describes an underground formation fracture propping method wherein proppant backflow from the fracture is prevented simultaneously. The method is based on the use of a mixture of fibrous bundles and proppant for filling the fracture when the fracture remains open and then the fracture is allowed to close on the proppant and fiber mixture. According to this patent, proppant backflow is prevented due to the use of the fiber bundles consisting of 5 to 200 separate fibers, the length of which ranges from 0.8 to 2.5 mm and the diameter of which ranges from 10 to 1000 μm.

The addition of fibers or fiber-like structures to the product can contribute to the reduction of proppant backflow and simultaneously increase the density of proppant packing in the fracture. Also the fibers reduce the migration of fine grained proppant and thus prevent the reduction of proppant packing permeability in the fracture, though not completely.

In U.S. Pat. No. 5,330,005, a method of controlling proppant backflow from an underground formation is disclosed wherein the addition of fiber materials to the mixture used for hydraulic fracturing and to the well gravel-packed filter reduces proppant backflow and/or the production of fine grained grit in the packing, thus stabilizing the packing and reducing the consumption of high polymer fluids. The preferable materials for the fibers are glass, aramid, nylon and other natural or synthetic organic and inorganic fibers and metallic wires.

A method wherein the underground formation is processed by pumping a mixture of standard proppant and deformed material particles into the formation is described in U.S. Pat. No. 6,330,916. The deformed material particles can be combined with standard proppant for increasing the permeability, reducing the production of fine grained proppant grit and/or reducing proppant backflow. The propping agent can be a material such as sand, and the deformed particles can be a material such as polystyrene divinylbenzene beads. Also this patent discusses the possibility of using natural materials such as nutshells, seeds, fruit seeds and processed wood. However, natural materials can add an extra amount of fine grained material to the packing and thus reduce the permeability.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
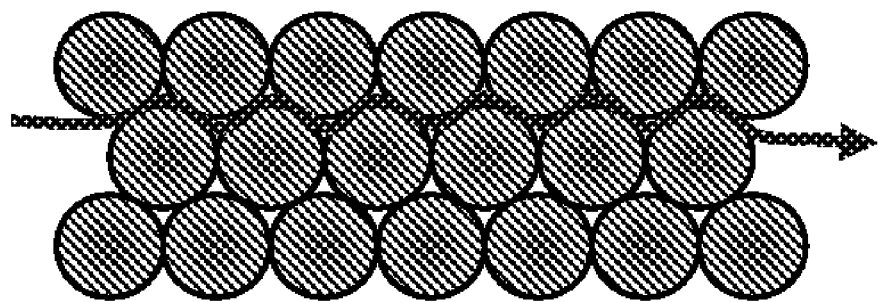
FIG. 1 is a schematic illustration showing fluid flow through a standard proppant packing.

A new type of propping filler material and improved propping of a fracture or a portion thereof, for example, the end part of a fracture close to the well, for increasing well permeability and productivity is provided. By using the new proppant material, almost complete prevention of sand backflow, a significant increase in sand packing permeability and prevention of the production of fine grained proppant is achieved.

The novel proppant material is in the form of generally rigid particles having a degree of elasticity that are configured as plates or gratings having a maximum to minimum dimension ratio of more than about 5. The gratings differ from the plates in that they are configured similar to netting or otherwise provided with a plurality of small openings to allow passage of fluids through the grating. A combination of proppant in the form of plates and gratings may also be used. Unless otherwise expressly stated or as may be readily apparent from the context, the expression "plate-like" is meant to encompass proppant configured as both plates and gratings.

The plate-like proppant material may be formed from a corrosion resistant material. The plate or grating proppant material should be substantially non-deformable or non-malleable. Examples of suitable materials having the desired characteristics of rigidity and elasticity for the plate-like proppant particles include stainless steel or low-carbon steel. Such materials may be provided with a corrosion resistant coating to facilitate corrosion resistance. Other materials having similar properties to steel, with respect to its rigidity and elasticity, may also be used.

The overall shape of the plate-like particles are generally thin plates of material. Examples of suitable dimensions for the plate-like proppant in many applications are from about 2 mm to about 4 mm by about 6 mm to about 10 mm. The greater dimensions of the plate-like particles may be several times greater than that of the non-plate-like proppant with which it is used. The thickness of the plate-like particles may range from about 100 to about 300 μm.

It should be understood that throughout this specification, when a concentration or amount range is described, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventor(s) appreciate and understand that any and all data points within the range are to be considered to have been specified, and that the inventor(s) have possession of the entire range and all points within the range.

The material used for the suggested particles may be a corrosion resistant material such as stainless steel or low-carbon steel with a corrosion resistant coating. This will prevent corrosion of the particles in the well atmosphere. The particle thickness should be in the range from about 100 to about 300 μm, with a thickness of from about 100 μm to about 150 μm or about 200 μm being useful in many applications. As the result depends on the total area of surface in the sand or proppant, if finer particles are used, their total surface area will be greater given the same weight. However, too fine particles will not withstand high pressure in the well, and their surface will be distorted and the expected result will not be achieved.

This invention prevents the production of fine grained proppant which is a problem for any type of natural proppant. Other types of materials such as deformable materials prevent proppant backflow and fine grained proppant migration but can also act to reduce the permeability and porosity of the proppant packing. The plate-like proppant materials of the invention increase the permeability of proppant packing, but this result can only be achieved if general rigid particles having a degree of elasticity, such as steel, are used. The plate-like proppant materials also increase the stability of the proppant packing and thus improve the packing parameters.

When used in hydraulic fracturing, the plate-like proppant is used in conjunction with conventional proppant materials, such as sand and the like. By using the plate or grating proppant materials, the permeability of the fracture is increased. This increased permeability may be explained by what is referred to as the "wall effect."

In reactors, it is well-known that a high porosity zone exists near reactor walls that contain an immobile particulate catalyst layer. This zone spreads to a depth of about 2-3 particle sizes. This high porosity zone distorts the reaction rate profile, and high reactant velocities are observed near the reactor walls. This process usually deleteriously affects the overall operation of the reactor.

Figure 2:
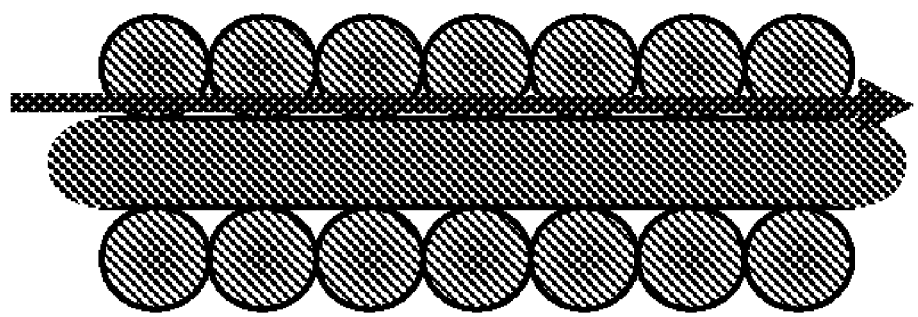
FIG. 2 is a schematic illustration showing fluid flow through a proppant packing employing the proppant packing material of the invention.

In the present invention, this so-called wall effect can be used to advantage for increasing the proppant/sand layer permeability. This is achieved by introducing an additional surface to the packing by way of the plate-like proppant. The particles with a high ratio of geometric dimensions act as an additional surface or "wall" in the proppant/sand packing. This effect is illustrated in FIGS. 1 and 2. FIG. 1 shows the fluid flow mechanism through a standard proppant/sand packing without the use of any plate-like proppant. FIG. 2 shows the fluid flow in a proppant packing employing a plate-like proppant with a high ratio of maximum to minimum geometric dimensions. The flat surfaces of the plate-like proppant increase the porosity of the packing and produce a high permeability area near the plate-like particle surface. The proppant configured as a grating provides even higher permeability. It should also be noted that gratings are more efficient than plates at low pressures (to 4000 psi) due to their porous structure.

Figure 3:
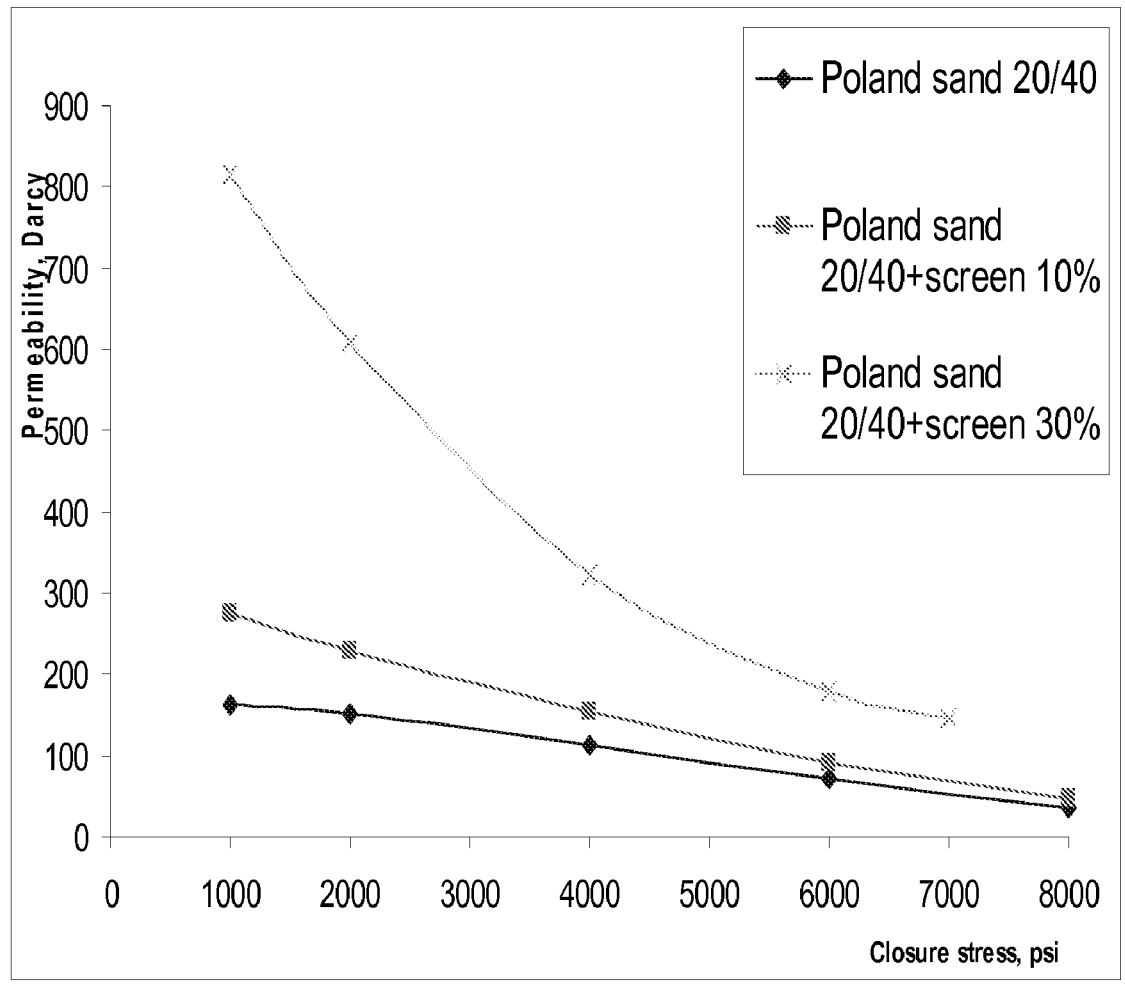
FIG. 3 is a plot of permeability versus closure stress for different packing materials.
Figure 4:
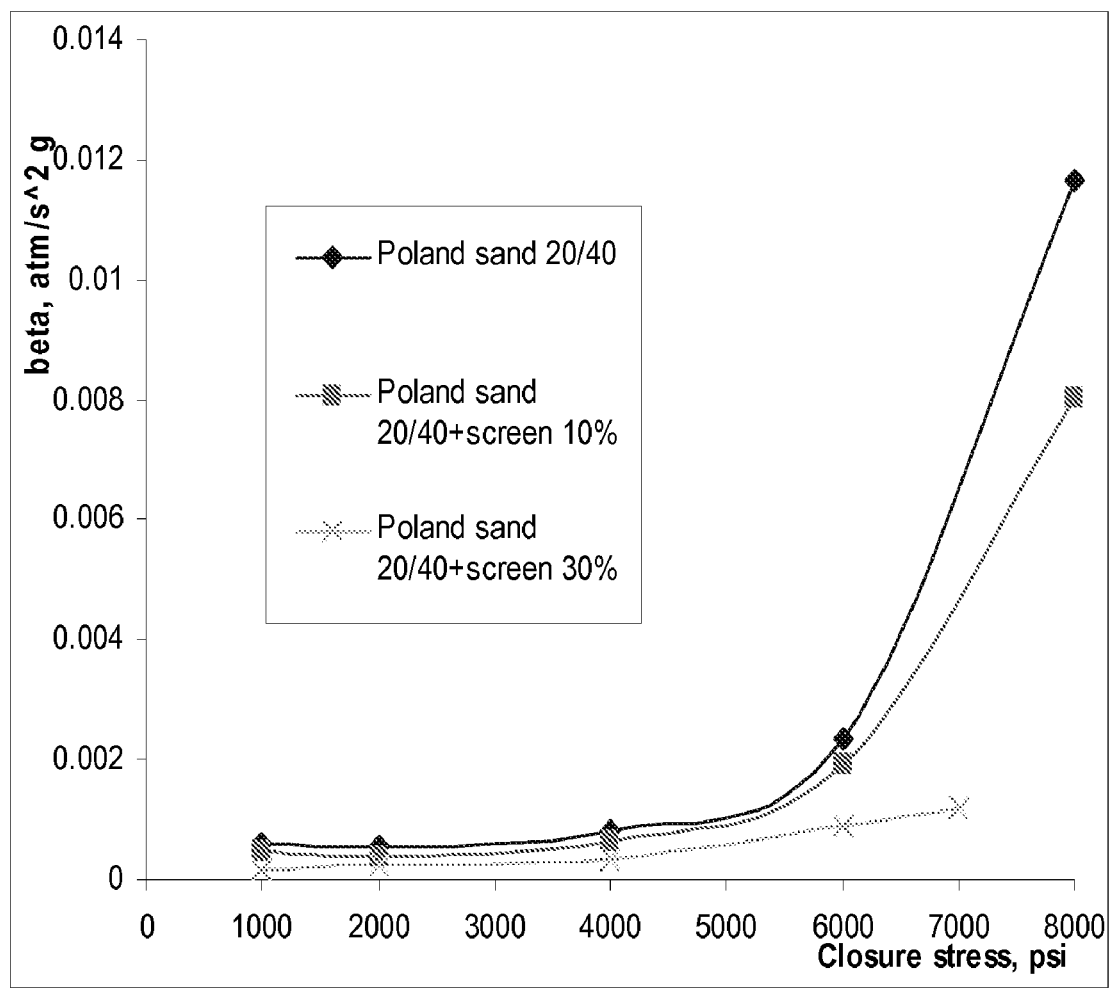
FIG. 4 is a plot of beta factor versus closure stress for different packing materials.

FIGS. 3 and 4 illustrate the results of stainless steel gratings used with 20/40 mesh sand. FIG. 3 shows the permeability versus closure stress of different packings employing sand only, sand+10% of the stainless steel gratings and sand+30% of the stainless steel gratings. FIG. 4 shows the beta factor versus closure stress of different packings employing sand only, sand+10% of the stainless steel gratings and sand+30% of the stainless steel gratings.

It can be seen that 10% of particles in the sand packing provide approximately a 30% increase in the permeability at 7000 psi. The beta factor is in this case 10% lower than for standard sand. When the amount of stainless steel gratings in sand is increased to 30%, a 200% increase in the permeability of the sand packing and a 6-fold reduction of the beta factor at 7000 psi. This significant reduction of the beta factor can be very favorable for formations where a high beta factor is observed (e.g. wells with compressed gas).

The addition of the new proppant material to the sand significantly increases the permeability of the sand packing (for example by about 2-7 times), significantly reduces (for example by about 3-6 times) the beta factor as compared with pure sand packing and almost completely prevents the undesired backflow of sand into the well.

The formed plate-like proppant materials, along with other proppant materials (e.g. sand), may be introduced into a wellbore that penetrates a subterranean formation. The proppant materials may be introduced in a suitable carrier fluid, along with any additives, having a sufficient viscosity or pumped at a rate to suspend the proppant materials. The carrier fluid containing the proppant materials may be introduced at a pressure at or above the fracture pressure of the formation being treated.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

What is claimed is:

1. A proppant material comprising a proppant that is in the form of generally rigid, elastic particles in the form of a grating having a maximum to minimum dimension ratio of more than about 5, the proppant being at least one of formed from a corrosion resistant material or having a corrosion resistant material formed thereon and having a thickness of from about 100 to about 300 .mu.m.

2. A proppant material comprising:
   a proppant that is in the form of generally rigid, elastic particles in the form of a grating having a maximum to minimum dimension ratio of more than about 5, the proppant being at least one of formed from a corrosion resistant material or having a corrosion resistant material formed thereon.

3. The proppant material of claim 2, wherein:
   the particles being generally non-deformable.

4. The proppant material of claim 2, wherein:
   said corrosion resistant material is stainless steel.

5. The proppant material of claim 2, wherein:
   the proppant is formed from carbon steel provided with a corrosion resistant coating.

6. The proppant material of claim 2, wherein:
   the particles have a thickness of from about 100 to about 300 .mu.m.

* * * * *